United States Patent [19]

Strauff

[11] 3,917,018
[45] Nov. 4, 1975

[54] DEVICE FOR CHANGING THE HYDRAULIC TRANSMISSION RATIO OF SERVO-MOTOR STEERING MECHANISMS

[75] Inventor: Günther Strauff, Kaarst, Germany
[73] Assignee: Langen & Company, Duesseldorf, Germany
[22] Filed: Nov. 12, 1973
[21] Appl. No.: 415,167

[30] Foreign Application Priority Data
Nov. 16, 1972 Germany............................ 2256074

[52] U.S. Cl. ............................... 180/79.2 R; 91/434
[51] Int. Cl.² ........................................... B62D 5/08
[58] Field of Search............ 180/79.2 R; 91/434, 465

[56] References Cited
UNITED STATES PATENTS
2,707,939  5/1955  Worley ............................. 91/465 X
2,930,357  3/1960  Brueder ............................ 91/465 X Primary Examiner—David Schonberg
Assistant Examiner—John A. Pekar
Attorney, Agent, or Firm—Holman & Stern

[57] ABSTRACT

A device for changing the hydraulic transmission ratio of servo steering mechanisms in which there is provided a pressure-control device which reacts to minute rotation of two sections of a multi-sectional power transmission system between a steering wheel etc. and steerable wheels etc., for controlling a servo motor as well as reaction members, which operate between the two sections in the form of hydraulic pistons, which are provided with at least one effective area stressable by the pressure of the inherent working or operating space of the servo motor and thus signals back to the steering wheel a power which is to be developed by the servo motor, in general a proportional power, with the pistons being preferably identical with the control pistons of the pressure-control system.

4 Claims, 1 Drawing Figure

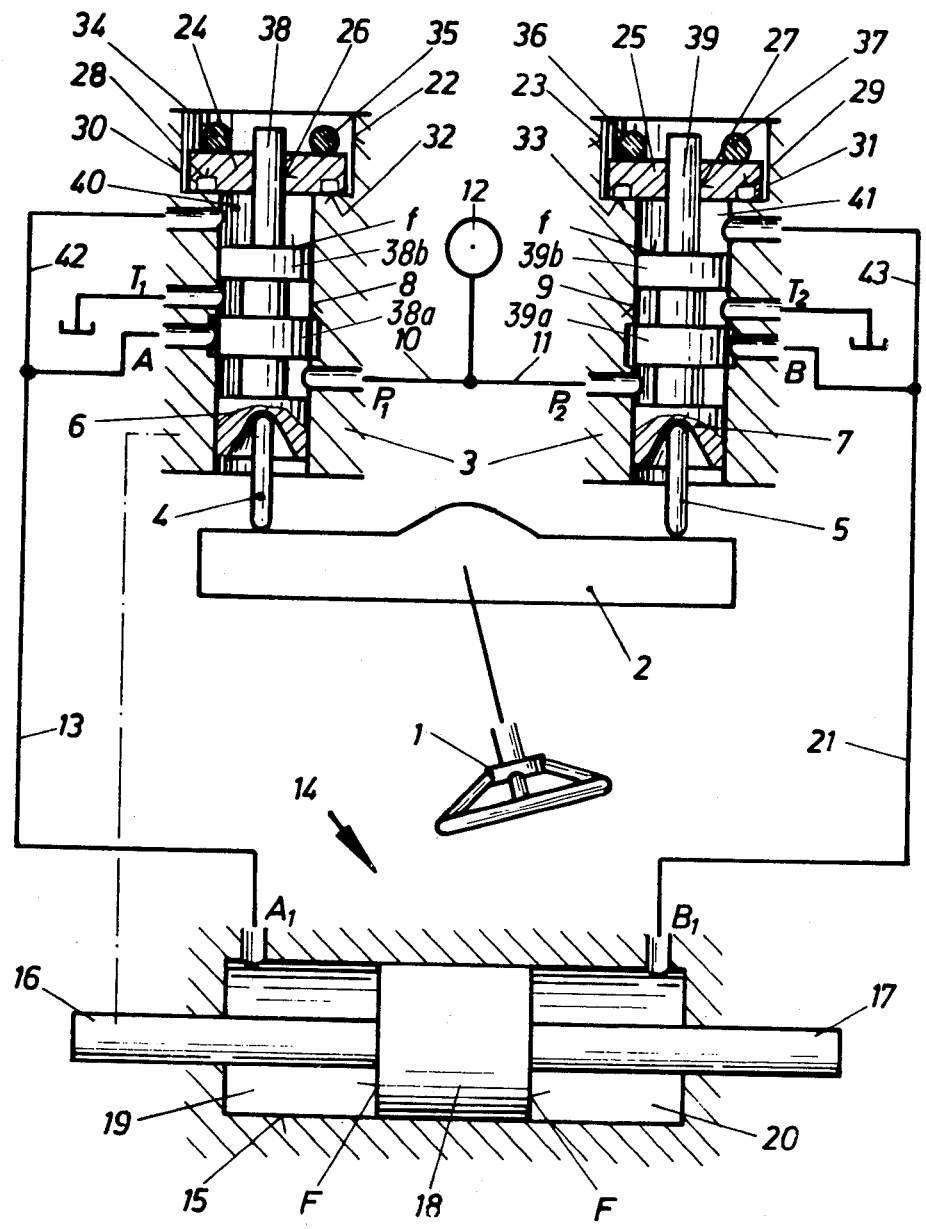

DEVICE FOR CHANGING THE HYDRAULIC TRANSMISSION RATIO OF SERVO-MOTOR STEERING MECHANISMS

BACKGROUND OF THE INVENTION

The present invention relates to means for changing the hydraulic transmission ratios of servo-steering mechanisms via a pressure-regulator which reacts to minute rotations of two sections of a multi-sectional power-transmission system provided between a steering wheel and steerable wheels for controlling a servo-motor as well as reaction members which operate between the two sections in the form of hydraulic pistons having at least one effective area which can be stressed by the pressure of the working or operating space of the servo-motor and thereby signals back to the steering wheel the power which is developed by the servo-motor (generally a proportional power), in which the pistons are preferably identical with the control pistons of the pressure-regulator.

PRIOR ART

In the prior art arrangements, the power flows from the steering wheel via a steering wheel shaft or spindle to an actuating member which acts upon the control pistons or the reaction pistons. The reaction pistons support themselves on a hydraulic cushion under a predetermined pressure and thus transmit power to a further part of the steering wheel shaft or spindle, from whence is effected a further transmission to the steerable wheels via additional rods and gears. However, since the servo-motor, which has a larger working or operating space than a reaction piston, becomes activated at the same time, the total steering power includes two components. The sum of the individual components is computed from the ratio of the working spaces in combination with the active lever arms. If one assumes the lever arms to be constant, then the ratio of the working areas of the servo-motor and reaction pistons can be defined as the hydraulic transmission ratio. It has been proven as effective to paticularly adapt this transmission ratio to certain types of motor vehicles or motor boats. In certain cases of application in which large amounts of power has to be overcome, a similarly large transmission ratio can be selected without causing a reduction in the hydraulic power to an extent so that any sensitivity would be lost. In the opposite situation, namely, in vary low powers, one could only select a very low transmission ratio. Since a changing of the lever arm is not suitable or even impossible, the working space of the reaction pistons must be altered. A change of this working space generally means a change of the diameter. It has been recognized in the prior art that such a mode of change can be extremely costly if the diameter of the reaction piston as well as the diameter of the respective bore or cylinder are changed. Such a cost is in contrast with the principle of mass production and of the building block principle.

In a known construction, it has been possible to leave the reaction piston and the bore or cylinder unchanged while an additional piston was proposed to be guided in a sleeve inserted into the bore. The resultant working space represented the difference of the front areas of the reaction piston and additional piston. However, this measure can be utilized only in such reaction pistons as could be operated by means of a finger engaging at approximately the center of the axial expansion. In frontally-operated reaction pistons, it is not possible to mount an additional piston.

SUMMARY OF THE INVENTION

It is therefore the object of this invention to make it possible to change the transmission ratio in frontally-operated reaction pistons in which at least the diameter of the bore or cylinder and hence the casing remains unchanged.

The problem has been solved in that a reaction piston is provided at its side or face opposite the active side of the face with a peg-like projection which, at one part of its length, is surrounded by an annulus serving as a reaction chamber, with the remaining part of its length being retained tightly in a bore located in a plate or disc, with the plate or disc closing the bore of the reaction piston in a pressure-tight manner and in which the peg-like projection is frontally-stressed by a generally constant low pressure. Advantageously, the plate or disc is retained in a counter-sunk area or depression located concentric to the bore or cylinder of the reaction piston and radially displacable by a small amount but being axially stationary.

The plate or disc may be provided with a frontal, annular groove into which is positioned a sealing ring for sealing the gap between the plate or disc and the bottom of the counter-sunk area or depression. The axial fixing of the plate or disc can be via clamping bolts extending through the counter-sunk area.

BRIEF DESCRIPTION OF THE DRAWINGS

The sole FIGURE is a diagrammatic view of the components constituting a preferred embodiment of the invention.

DETAILED DESCRIPTION OF THE INVENTION

A moment of rotation is transmitted from a steering wheel 1 to a crossbar or lever 2 in a manner not illustrated and in which the crossbar 2 functions as an actuating member. The crossbar 2 is rotatable by a small value relative to a valve member 3 (not shown in detail) and via pushrods 4 and 5 affects pistons 6 and 7, respectively, which function simultaneously as control pistons and as reaction pistons. The pistons 6 and 7 are mounted transverse and eccentric to the axis of the valve member 3 in bores or cylinders 8 and 9 respectively.

The piston 6, depending on its position, connects a connection A with a connection $P_1$, or with a drain $T_1$. In a similar manner, the piston 7, depending on its position, connects connection B either with connection $P_2$ or with drain $T_2$. The connections $P_1$ and $P_2$ are connected with a mutual pressure source 12 via lines or pipes 10 and 11, respectively. The pressure medium can flow back pressureless from the drain $T_1$ and $T_2$ into a reservoir (not shown in detail).

A line or pipe 13 leads from connection A to a connection $A_1$ of a servo-motor denoted generally 14. The servo-motor 14 includes a cylinder 15 in which a piston 18 provided with piston rods 16 and 17 extending from the opposite faces thereof, is closely slidably arranged. The connection $A_1$ communicates with an operating or working space or chamber 19 which surrounds the piston rod 16. An operating or working space or chamber 20 surrounds the piston rod 17 and is connected with the connection B via a connection $B_1$ and a pipe or line 21. The functional annular faces or areas of the pistons 18 are indicated F.

The bores or cylinders 8 and 9 are widened preferably into concentric counter-sunk areas or depressions 22 and 23, respectively. Plates or discs 24 and 25 are located in the counter-sunk areas 22 and 23 and are provided with central through bores 26 and 27, respectively. The plates 24 and 25 are provided preferably with annular grooves 28 and 29 in which are located sealing rings 30 and 31, respectively, which sealingly close the gaps between the discs 24 and 25 and bottom surfaces 32 and 33 of the counter-sunk areas 22 and 23. The discs or the plates 24 and 25 are fixed axially by means of clamping bolts 34, 35 and 36 and 37, respectively, with the bolts extending through the counter-sink. The diameter of the plates 24 and 25 is lesser by a certain degree than the diameters of the counter-sunk areas 22 and 23, as clearly shown in the FIGURE.

On their sides or faces opposite the pushrods 4 and 5, the pistons 6 and 7 are provided with peg-like projections 38 and 39 which are tightly guided in the through bores 26 and 27 of the plates 24 and 25. The projections 38 and 39 are provided with axially-spaced lands 38a, 38b and 39a and 39b. Between the land 38b and the plate 24, the projection 38 is surrounded by an annular reaction chamber 40 and between the land 39b and the plate 25, the projection 39 is surrounded by an annular reaction chamber 41. The annular faces of the pistons 6 and 7 which become operative in these reactions chambers 40 and 41, are indicated $f$.

The line or pipe 13 or the connection A is connected with the reaction chamber 40 via a pipe or line 42, and in a similar manner, the pipe 21 or connection member B is in communication with the reaction chamber 41 via a pipe or line 43.

It will be readily appreciated that the hydraulic transmission ratio $F:f$ can be changed by changing the respective functional areas. For this purpose, it is only necessary to change the diameter of the through bores 26 and 27 of the plates 24 and 25 and the diameters of the peg-like projections 38 and 39. The diameters of the bores or cylinders 8 and 9 and the remaining diameters of the pistons 6 and 7 may thus remain unchanged. Also, the counter-sunk areas 22 and 23 may retain the same dimensions so that the valve member 3 will not require changing. In certain cases, it will also be possible to manufacture the projections 38 and 39 separately from the pistons 6 and 7 and to connect such components thereafter, thereby expediting any desired change in the hydraulic transmission ratio. Due to the axial non-displacability of the discs or plates 24 and 25, the problems of double-centering which usually develops are eliminated.

The present invention is, by no means, limited to the embodiments illustrated. It is possible to vary the shape of the pistons 6 and 7. Thus, it is, for example, feasible to provide pistons having only two shoulders. It is also possible in such types of pistons to locate the pipes or lines 42 and 43 inside the pistons. The sealing and installation of the plates or discs 24 and 25 can also be accomplished in another fashion. Primarily, it should also be pointed out that all remaining additional characteristics of a servo-steering system, such as steering-wheel limitation etc., remain uninfluenced by the present invention.

This invention is not to be confined to any strict conformity to the showings of the drawings, and changes or modifications can be made therein so long as such changes and modifications mark no material departure from the spirit and scope of the appended claims.

I claim:

1. In a vehicle having a steering wheel and steerable road wheels and a power transmission including two sections interposed between said steering wheel and steerable wheels, a pressure-control device having control pistons movable in a bore and which react to minute rotations of the two sections of the power transmission for controlling a servo-steering mechanism having a servo-motor, and a pair of reaction members which respectively operate within said two sections, each of said reaction members comprising a hydraulic piston which is provided with at least one effective area stressable by the pressure of the working or operating space of the servo-motor and thus signals back to the steering wheel a proportional power which is to be developed by the servo-motor, and in which said hydraulic pistons comprise said control pistons of the pressure-control device, the improvement which comprises a projection extending from each of said hydraulic pistons at their side opposite to the actuating side, an annular reaction chamber surrounding each projection at one part of its length, a plate having a through bore in which the remaining part of the length of each of said projections is tightly guided, said plate positioned over and sealing the bores of the pistons in a pressure-tight manner, each projection being frontally stressed by a substantially constant pressure, each plate being axially non-displaceable, the hydraulic transmission ratio of said servo-steering mechanism being determinable in part by the diameters of said through bores and said projections extending therethrough.

2. The device as claimed in claim 1 in which each plate is arranged in a counter-sunk area located concentric to the bore of the piston.

3. The device as claimed in claim 2 in which each plate is provided with a frontal, annular groove, and a sealing ring seated in said annular groove sealingly covering the gap between the plate and the bottom of the counter-sunk area.

4. The device as claimed in claim 3 in which each plate is axially non-displacable by at least one clamping bolt extending into the counter-sunk area.

* * * * *